United States Patent
Bin Omar et al.

(10) Patent No.: US 11,840,908 B2
(45) Date of Patent: Dec. 12, 2023

(54) ACIDIZING FLUID AND METHOD OF IMPROVING HYDROCARBON RECOVERY USING THE SAME UTILIZING A SURFACTANT CONSISTING OF AN OIL MIXTURE

(71) Applicant: Saudi Arabian Oil Company, Dhahran (SA)

(72) Inventors: Abdulrahman M. Bin Omar, Dammam (SA); Abdulaziz S. Al-Qasim, Dammam (SA); Abdullah M. Moajil, Dammam (SA); Sajjad S. Aldarweesh, Dammam (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 17/489,897

(22) Filed: Sep. 30, 2021

(65) Prior Publication Data

US 2022/0106862 A1    Apr. 7, 2022

Related U.S. Application Data

(60) Provisional application No. 63/086,135, filed on Oct. 1, 2020.

(51) Int. Cl.
*C09K 8/34* (2006.01)
*E21B 43/16* (2006.01)

(52) U.S. Cl.
CPC ............... *E21B 43/16* (2013.01); *C09K 8/34* (2013.01)

(58) Field of Classification Search
CPC .................................. E21B 43/16; C09K 8/34
See application file for complete search history.

(56) References Cited

U.S. PATENT DOCUMENTS

| | | | |
|---|---|---|---|
| 4,525,287 A | 6/1985 | Carstensen | |
| 4,873,008 A | 10/1989 | Landis et al. | |
| 4,954,242 A | 9/1990 | Gruia | |
| 4,961,839 A | 10/1990 | Stine et al. | |
| 5,120,427 A | 6/1992 | Stine et al. | |
| 5,139,644 A | 8/1992 | Gruia | |

(Continued)

FOREIGN PATENT DOCUMENTS

| | | |
|---|---|---|
| EP | 308651 A2 | 3/1989 |
| EP | 770661 A1 | 5/1997 |

(Continued)

OTHER PUBLICATIONS

International Search Report and Written Opinion pertaining to International Application No. PCT/US2021/052769 dated Jan. 27, 2022.

(Continued)

*Primary Examiner* — Silvana C Runyan
(74) *Attorney, Agent, or Firm* — DINSMORE & SHOHL LLP

(57) ABSTRACT

In accordance with one or more embodiments of the present disclosure, an acidizing fluid suitable for use in acid treatment of subterranean formations includes an aqueous base fluid, an acid, and a surfactant comprising an oil mixture. The oil mixture comprises no more than 5% by volume of the acidizing fluid. Also described are methods of improving hydrocarbon recovery from a subterranean formation.

18 Claims, 1 Drawing Sheet

(56) References Cited

U.S. PATENT DOCUMENTS

| | | | |
|---|---|---|---|
| 5,139,646 A | 8/1992 | Gruia | |
| 5,296,132 A | 3/1994 | Hart | |
| 5,389,299 A | 2/1995 | Hart | |
| 5,658,860 A * | 8/1997 | Clark | C09K 8/28 507/135 |
| 6,624,124 B2 | 9/2003 | Garmier | |
| 6,806,235 B1 | 10/2004 | Mueller et al. | |
| 7,373,977 B1 | 5/2008 | Berger et al. | |
| 8,343,334 B2 | 1/2013 | Koseoglu | |
| 8,403,051 B2 | 3/2013 | Huang et al. | |
| 8,828,219 B2 | 9/2014 | Koseoglu | |
| 8,877,040 B2 | 11/2014 | Hoehn et al. | |
| 9,023,191 B2 | 3/2015 | Teshima et al. | |
| 9,388,347 B2 | 7/2016 | Ramaseshan et al. | |
| 9,534,179 B2 | 1/2017 | Koseoglu | |
| 9,580,663 B2 | 2/2017 | Low et al. | |
| 9,663,732 B2 | 5/2017 | Ganyu | |
| 9,701,912 B2 | 7/2017 | Hoehn et al. | |
| 9,783,748 B2 | 10/2017 | Harvey et al. | |
| 9,914,889 B2 | 3/2018 | Hoehn et al. | |
| 9,944,863 B2 | 4/2018 | Zhang et al. | |
| 10,011,786 B1 | 7/2018 | Eizenga et al. | |
| 10,053,619 B2 | 8/2018 | Saboowala et al. | |
| 10,301,560 B2 | 5/2019 | Wang et al. | |
| 10,435,635 B2 | 10/2019 | Hoehn et al. | |
| 10,533,142 B2 | 1/2020 | Sauge et al. | |
| 2004/0127581 A1 | 7/2004 | Baran, Jr. et al. | |
| 2005/0202097 A1 | 9/2005 | Maskin | |
| 2007/0042913 A1 | 2/2007 | Hutchins et al. | |
| 2007/0129257 A1 | 6/2007 | Kippie et al. | |
| 2007/0142235 A1 * | 6/2007 | Berger | C09K 8/584 507/268 |
| 2007/0287636 A1 | 12/2007 | Heller et al. | |
| 2008/0161207 A1 | 7/2008 | Welton et al. | |
| 2011/0071060 A1 | 3/2011 | Nguyen | |
| 2013/0109879 A1 | 5/2013 | Berger et al. | |
| 2014/0284053 A1 * | 9/2014 | Germack | C09K 8/26 166/279 |
| 2015/0159071 A1 | 6/2015 | Massey et al. | |
| 2016/0257911 A1 * | 9/2016 | Denison | C11D 3/188 |
| 2016/0347990 A1 | 12/2016 | Vanzin et al. | |
| 2017/0121585 A1 | 5/2017 | Hossain | |
| 2017/0137689 A1 | 5/2017 | Deroo | |
| 2017/0198201 A1 | 7/2017 | Chang | |
| 2017/0226412 A1 * | 8/2017 | Salla | C09K 8/68 |
| 2018/0057732 A1 | 3/2018 | Babcock | |
| 2018/0223167 A1 | 8/2018 | Albahrani et al. | |
| 2018/0223175 A1 | 8/2018 | Al-Yami et al. | |
| 2018/0346798 A1 | 12/2018 | Abdel-Fattah et al. | |
| 2019/0048287 A1 | 2/2019 | Long et al. | |
| 2019/0055459 A1 | 2/2019 | Zelenev et al. | |
| 2019/0177603 A1 * | 6/2019 | Abad | C09K 8/506 |

FOREIGN PATENT DOCUMENTS

| | | | | |
|---|---|---|---|---|
| JP | 4567445 B2 | 10/2010 | | |
| RU | 2623380 C1 | 6/2017 | | |
| WO | 2004053016 A1 | 6/2004 | | |
| WO | 2004101955 A1 | 11/2004 | | |
| WO | 2010065634 A2 | 6/2010 | | |
| WO | WO-2015033281 A1 * | 3/2015 | | B01D 17/047 |
| WO | 2015135777 A2 | 9/2015 | | |
| WO | 2016138072 A1 | 9/2016 | | |
| WO | 2018005341 A1 | 1/2018 | | |
| WO | 2018081063 A1 | 5/2018 | | |
| WO | 2018144277 A1 | 8/2018 | | |
| WO | 2020175649 A1 | 9/2020 | | |
| WO | 2021091631 A1 | 5/2021 | | |

OTHER PUBLICATIONS

International Search Report and Written Opinion pertaining to International Application No. PCT/US2020/053253 dated Jan. 21, 2021.

International Search Report and Written Opinion pertaining to International Application No. PCT/US2020/066302 dated Apr. 1, 2021.

Office Action pertaining to U.S. Appl. No. 16/672,967 dated Nov. 24, 2020.

Office Action pertaining to U.S. Appl. No. 16/672,967 dated Aug. 18, 2020.

Office Action pertaining to U.S. Appl. No. 17/073,741 dated Dec. 8, 2021.

Office Action pertaining to U.S. Appl. No. 16/672,967 dated Jul. 20, 2021.

Office Action pertaining to U.S. Appl. No. 16/922,088 dated Sep. 13, 2021.

Office Action pertaining to U.S. Appl. No. 17/183,802 dated Feb. 3, 2022.

U.S. Notice of Allowance pertaining to U.S. Appl. No. 16/672,967 dated Nov. 15, 2021.

Andersson et al., "First-Principles Prediction of Liquid/Liquid Interfacial Tension", Journal of Chemical Theory and Computation, vol. 10, pp. 3401-3408, May 28, 2014.

Rudyk et al., "Supercritical carbon dioxide extraction of oil sand enhanced by water and alcohols as Co-solvents", Journal of CO2 Utilization, vol. 17, pp. 90-98, 2017.

Veronina et al., "Physical foaming of fluorinated ethylene-propylene (FEP) copolymers in supercritical carbon dioxide: single-film fluoropolymer piezoelectrets", Applied Physics A, vol. 90, pp. 615-618, 2008.

Zhang et al., "Dissolution of surfactants in supercritical CO2 with co-solvents", Chemical Engineering Research and Design, vol. 94, pp. 624-631, 2015.

Busson-Breysse, "Jojoba was: Its esters and some of its minor components", Journal of the American Oil Chemists' Society, vol. 71, No. 9, pp. 999-1002, Sep. 1994.

Youssif, Ahmed A A et al. "Production of Bio Lubricant from Jojoba Oil Synthesis and Characteristic of Carboxymethyl Cellulose from Baobab (*Adansonia digitata* L.) Fruit Shell View project", International Journal of Engineering Innovation & Research vol. 8, Issue 4, ISSN: 2277-5668, Jul. 17, 2019, pp. 146-153.

Abobatta, Waleed F. "*Simmondsia chinensis* Jojoba tree", Journal of Advanced Trends in Basic and Applied Science, vol. 1, No. 1: 160-165, 2017.

Dubois, V. et al., "Fatty acid profiles of 80 vegetable oils with regard to their nutritional potential",, Eur. J. Lipid Sci. Technol 109 (2007), pp. 710-732 (Year: 2007).

Product data sheets of linolenic acid by Sigma-Aldrich (Year: 2020).

Product data sheets of linoleic acid by Millipore-Sigma (Year: 2020).

Gayol et al., "Chemical Quality Evaluation of Damaged Jojoba Seeds (*Simmondsia chinesis*)", J. Am Oil Chem Soc, vol. 86, pp. 65-70, 2009.

U.S. Notice of Allowance and Fee(s) Due dated Mar. 29, 2022 pertaining to U.S. Appl. No. 17/073,741, filed Oct. 19, 2020, 24 pages.

International Search Report and Written Opinion dated Feb. 28, 2022 pertaining to International application No. PCT/US2021/054360 filed Oct. 11, 2021, 14 pages.

U.S. Office Action dated Mar. 15, 2022 pertaining to U.S. Appl. No. 16/922,088, filed Jul. 7, 2020, 34 pages.

U.S. Office Action dated Nov. 23, 2022 pertaining to U.S. Appl. No. 16/922,088, filed Jul. 7, 2020, 17 pages.

Danila et al., Formulation and characterization of some oil in water cosmetic emulsions based on collagen hydrolysate and vegetable oils mixtures Pure Appl. Chem. 2019, 91 (9): 1493-1507 ( Year: 2019).

* cited by examiner

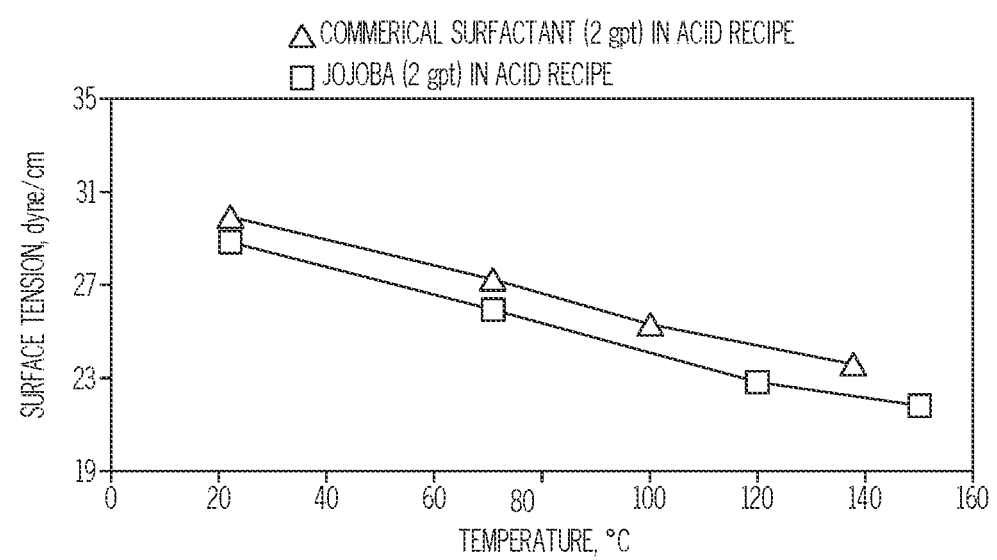

ACIDIZING FLUID AND METHOD OF IMPROVING HYDROCARBON RECOVERY USING THE SAME UTILIZING A SURFACTANT CONSISTING OF AN OIL MIXTURE

CROSS-REFERENCE TO RELATED APPLICATION

This application claims priority to U.S. Provisional Application No. 63/086,135, filed Oct. 1, 2020, the entire content of which is incorporated herein by reference.

FIELD

The present disclosure relates to hydrocarbon recovery from subterranean formations and, more specifically, to acidizing fluids that can be used in enhanced oil recovery and reservoir stimulation applications.

TECHNICAL BACKGROUND

The discovery and extraction of hydrocarbons, such as oil or natural gas, from subterranean formations may be impeded for a variety of reasons, such as permeability variations, damage within the formation, or unwanted substances in the formation or recovery equipment. The production rate of hydrocarbons from a hydrocarbon-producing region of the formation may be reduced compared to the expected production rate as a result of these impediments. In these instances, methods for obtaining enhanced oil recovery from the hydrocarbon-producing regions of the formation can be utilized to improve hydrocarbon production.

Acid treatment, also referred to as "acidizing," is a widely proven technique to increase or restore production. Acidizing is a chemical process that dissolves unwanted substances in the formation, pipes, surface equipment, or flow-lines, of a hydrocarbon recovery operation, and stimulates the formation. Surfactants are widely used additives in the acidizing operation due to their role in reducing the surface tension, facilitating the flow back process, and reducing the pumping power needed to deliver the fluid downhole.

BRIEF SUMMARY

However, more effective acidizing treatments are desired. It has been discovered that the addition of an oil mixture to an acidizing fluid may improve acid stability and surface tension reduction ability. The present disclosure is directed to acidizing fluids that include an oil mixture and methods of improving hydrocarbon recovery using such acidizing fluids that include oil mixtures. Unexpectedly, it has been found that the addition of such oil mixtures into acidizing fluids may enhance oil production.

In accordance with one or more embodiments of the present disclosure, an acidizing fluid suitable for use in acid treatment of subterranean formations includes an aqueous base fluid; an acid; and a surfactant comprising an oil mixture. The oil mixture comprises no more than 5% by volume of the acidizing fluid.

In accordance with one or more embodiments of the present disclosure, a method of improving hydrocarbon recovery from a subterranean formation includes contacting the subterranean formation with an acidizing fluid; and collecting the hydrocarbons displaced by the acidizing fluid. The acidizing fluid includes an aqueous base fluid; an acid; and a surfactant comprising an oil mixture. The oil mixture comprises no more than 5% by volume of the acidizing fluid.

Additional features and advantages of the described embodiments will be set forth in the detailed description that follows. The additional features and advantages of the described embodiments will be, in part, readily apparent to those skilled in the art from that description or recognized by practicing the described embodiments, including the detailed description that follows as well as the FIGURE and the claims.

BRIEF DESCRIPTION OF THE DRAWING

The following detailed description of specific embodiments of the present disclosure can be best understood when read in conjunction with the following FIGURE in which:

THE FIGURE is a chart of surface tension in dyne/cm (y-axis) vs. temperature in ° C. (x-axis) for an exemplary acidizing fluid, according to one or more embodiments presently described, and an acidizing fluid using a commercially available surfactant.

DETAILED DESCRIPTION

Embodiments of the present disclosure are directed to acidizing fluids that may be suitable for use in acid treatment of subterranean formations. Additional embodiments, of the present disclosure are directed to methods of using such acidizing fluids for improving hydrocarbon recovery from a subterranean formation.

According to one or more embodiments of the present disclosure, an acidizing fluid that may be suitable for use in acid treatment of subterranean formations is provided. The acidizing fluid may include an aqueous base fluid, and acid, and a surfactant comprising an oil mixture. Other optional additives may also be present. The oil mixture comprises no more than 5% by volume of the acidizing fluid.

In one or more embodiments, the aqueous base fluid may comprise from 40% to 90% of the by volume acidizing fluid. For example, the aqueous base fluid may be present in a concentration (by volume) of from 45% to 85%, from 50% to 80%, from 55% to 75%, or even from 60% to 70%. The aqueous base fluid will be present in concentrations sufficient to bring the total volume of the acidizing fluid to the desired volume after accounting for the volume of all other components present in the acidizing fluid. It should be understood that a range of the concentrations of aqueous base fluid in the acidizing fluid may be formed from any of the lower bounds of such concentration and any of the upper bounds of such concentration as described herein.

In one or more embodiments, the aqueous base fluid may include one or more of deionized, tap, distilled, or fresh waters; natural, brackish, or saturated salt waters; natural, salt dome, hydrocarbon formation produced, or synthetic brines; filtered or untreated seawaters; mineral waters; or other potable or non-potable waters containing one or more dissolved salts, minerals, or organic materials. In one or more embodiments, the aqueous base fluid may comprise at least 70%, at least 80 wt. %, at least 90 wt. %, at least 95 wt. %, at least 99 wt. %, or even at least 99.9 wt. % of water.

In one or more embodiments, at least 70%, at least 75%, at least 80%, at least 85%, at least 90 wt. %, at least 95 wt. %, or even at least 99 wt. % of the aqueous base fluid by mass may be a brine solution. As used herein, the term "brine" may refer to a saturated solution of one or more alkali metal chlorides. For example, "brine" may refer to a saturated solution of NaCl, KCl, or mixtures thereof. Alternatively, the term "brine" may refer to naturally derived saltwater, for example, seawater or salt lake water, used in its natural state or after having undergone processing, such as filtration, to remove contaminants and large particles. In one or more embodiments, the aqueous solution may consist of brine.

In one or more embodiments, the acid may comprise from 1% to 24% of the acidizing fluid by volume. For example, the acid may comprise from 2% to 23%, from 3% to 22%, from 4% to 21%, from 5% to 20%, from 6% to 19%, from 7% to 18%, from 8% to 17%, from 9% to 16%, from 10% to 15%, from 11% to 14%, from 12% to 13%. from 5% to 15%, or even from 7.5% to 12.5% by volume of the acidizing fluid. It should be understood that a range of the concentrations of acid in the acidizing fluid may be formed from any of the lower bounds of such concentration and any of the upper bounds of such concentration as described herein.

In one or more embodiments, the acid may comprise one or more of hydrochloric acid, hydrofluoric acid, sulfonic acid, sulfonic acid derivatives (including, but limited to, methanesulfonic acid and other alkyl sulfonic acids, sulfonyl chloride and other sulfonyl halides, and mixtures of two or more thereof), esters, in situ generated acids (including, but not limited to, ethyl lactate and other alkyl lactates, polylactic acid, ethylene glycol diformate, organic ester, and mixtures of two or more thereof), and carboxylic acids (including, but not limited to, formic acid, acetic acid, lactic acid, glycolic acid, citric acid, glutamic-based acids, and mixtures of two or more thereof). In one or more embodiments, the acid does not comprise sulfuric acid.

In embodiments, the acid comprises hydrochloric acid in a concentration of from 5% by volume of the acidizing fluid to 20% by volume of the acidizing fluid or from 5% by volume of the acidizing fluid to 15% by volume of the acidizing fluid or from 7.5% by volume of the acidizing fluid to 12.5% by volume of the acidizing fluid or from 7.5% by volume of the acidizing fluid to 17.5% by volume of the acidizing fluid or from 10% by volume of the acidizing fluid to 15% by volume of the acidizing fluid.

In one or more embodiments, the oil mixture (i.e., a component of the surfactant) may comprise no more than 5% by volume of the acidizing fluid. In one or more embodiments, the oil mixture may comprise no more than 4% by volume of the acidizing fluid. In one or more embodiments, the oil mixture may comprise no more than 3% by volume of the acidizing fluid. In one or more embodiments, the oil mixture may comprise no more than 2% by volume of the acidizing fluid. In one or more embodiments, the oil mixture may comprise no more than 1% by volume of the acidizing fluid or less than or equal to 0.9% by volume of the acidizing fluid. For instance, in one or more embodiments, the oil mixture may comprise from 0.01% to 1%, from 0.05% to 0.95%, from 0.1% to 0.9%, from 0.15% to 0.85%, from 0.2% to 0.8%, from 0.25% to 0.75%, from 0.3% to 0.7%, from 0.35% to 0.65%, from 0.4% to 0.6%, from 0.45% to 0.55%, from 0.5% to 0.8%, or even from 0.6% to 0.7% of the acidizing fluid by volume. It should be understood that a range of the concentrations of oil mixture in the acidizing fluid may be formed from any of the lower bounds of such concentration and any of the upper bounds of such concentration as described herein.

Without intending to be bound by any particular theory, it is believed that including the oil mixture may reduce the surface tension of the acidizing fluid relative to acidizing fluids without the oil mixture. Thus, less energy may be required to pump the acidizing fluid into subterranean formations and for flowback operations after the acidizing treatment. Additionally, it is believed that the oil mixture may encourage microemulsion production, which may enhance the acidizing treatment by water wetting the subterranean formation. As used herein, the term "surface tension" refers to a type of surface free energy with respect to a liquid and may generally be defined as the amount of excess energy at the surface of the liquid, which exists because molecules located in an interior of the liquid are in a lower energy state than molecules at the surface of the liquid.

In one or more embodiments, the oil mixture may comprise, among other components, one or more fatty acids, such as 11-eicosenoic acid, oleic acid, and erucic acid. For instance, the oil mixture may comprise from 65 mol. % to 80 mol. % 11-eicosenoic acid, from 5 mol. % to 15 mol. % oleic acid, and from 10 mol. % to 20 mol. % erucic acid.

The oil mixture may comprise 11-eicosenoic acid in a concentration ranging from 65 mol. % to 80 mol. %, from 68 mol. % to 79 mol. %, from 72 mol. % to 78 mol. %, or even from 76 mol. % to 77 mol. %.

The oil mixture may comprise oleic acid in a concentration ranging from 5 mol. % to 15 mol. %, from 6 mol. % to 14 mol. %, from 7 mol. % to 13 mol. %, from 8 mol. % to 12 mol. %, from 9 mol. % to 11 mol. %, or even from 9 mol. % to 10 mol. %.

The oil mixture may comprise erucic acid in a concentration ranging from 10 mol. % to 20 mol. %, from 11 mol. % to 19 mol. %, from 12 mol. % to 18 mol. %, from 13 mol. % to 17 mol. %, from 13 mol. % to 16 mol. %, from 13 mol. % to 15 mol. %, from 12 mol. % to 14 mol. %, or even from 12 mol. % to 13 mol. %. In one or more embodiments, the oil mixture may comprise erucic acid in a concentration ranging from 10 mol. % to 15 mol. %, from 11 mol % to 14 mol. %, or even from 12 mol. % to 13 mol. %.

According to additional embodiments, the oil mixture is naturally derived and may comprise, for example, jojoba oil, castor oil, cactus oil, almond oil, or a mixture of one or more of these. As described presently, naturally derived oils refer to single oils and mixtures of oils in which at least a portion of the oil is derived from a plant. Additionally, the oil mixture may be further diluted, thus lowering the concentration of the individual fatty acids in the oil mixture, or winterized, thus concentrating the fatty acids in the oil mixture, before using it in the acidizing fluid.

Although the fatty acid content of jojoba oil may vary significantly depending on many known variables, such as the soil composition in which the plant is grown and when in the plant's lifecycle it is harvested, a typical jojoba oil fatty acid composition is shown in Table 1. In one or more embodiments, the oil mixture may comprise one or more of the components of Table 1 in amounts defined by ranges that include plus or minus 5 mol. %, 4 mol. %, 3 mol. %, 2 mol. %, or 1 mol. % of the amounts listed in Table 1.

TABLE 1

| Fatty Acid | Mol. % |
| --- | --- |
| Palmitic acid | 0.3 |
| Palmitoleic acid | 0.3 |
| Stearic acid | 0.2 |
| Oleic acid | 9.3 |
| Arachidic acid | — |
| 11-Eicosenoic acid | 76.7 |

TABLE 1-continued

| Fatty Acid | Mol. % |
|---|---|
| Behenic acid | trace |
| Erucic acid | 12.1 |
| Lignoceric acid | 0.1 |
| Nervonic acid | 1 |

Castor oil is a vegetable oil pressed from castor beans. A typical castor oil fatty acid composition is shown in Table 2.

TABLE 2

| Fatty Acid | Wt. % |
|---|---|
| Ricinoleic acid | 85-95 |
| Oleic acid | 2-6 |
| Linoleic acid | 1-5 |
| α-Linolenic acid | 0.5-1 |
| Stearic acid | 0.5-1 |
| Palmitic acid | 0.5-1 |
| Dihydroxystearic acid | 0.3-0.5 |
| Others | 0.2-0.5 |

In one or more embodiments, the oil mixture may comprise, among other components, one or more fatty acids, such as ricinoleic acid and oleic acid. For instance, the oil mixture may comprise from 85 wt. % to 95 wt. % ricinoleic acid and from 2 wt. % to 6 wt. % oleic acid.

The oil mixture may comprise ricinoleic acid in a concentration ranging from 85 wt. % to 95 wt. %, from 86 wt. % to 94 wt. %, from 87 wt. % to 93 wt. %, from 88 wt. % to 92 wt. %, or even from 89 wt. % to 91 wt. %.

The oil mixture may comprise oleic acid in a concentration ranging from 2 wt. % to 6 wt. %, 3 wt. % to 5 wt. %, or even from 3.5 wt. % to 4.5 wt. %.

Cactus oil is extracted from the seeds of a species of cactus. A typical cactus oil fatty acid composition is predominantly a mixture of oleic acid, at about 13-24 wt. %, and linoleic acid, at about 55-65 wt. %.

The oil mixture may comprise oleic acid in a concentration ranging from 13 wt. % to 24 wt. %, from 14 wt. % to 23 wt. %, from 15 wt. % to 22 wt. %, from 16 wt. % to 21 wt. %, from 17 wt. % to 20 wt. %, or even from 18 wt. % to 19 wt. %.

The oil mixture may comprise linoleic acid in a concentration ranging from 55 wt. % to 65 wt. %, from 56 wt. % to 64 wt. %, from 57 wt. % to 63 wt. %, from 58 wt. % to 62 wt. %, from 59 wt. % to 61 wt. %, or even from 59.5 wt. % to 60.5 wt. %.

Sweet almond oil may be extracted from the kernel of almonds. A typical fatty acid composition of sweet almond oil is provided in Table 3.

TABLE 3

| Fatty Acid | Wt. % |
|---|---|
| Oleic acid | 25-35 |
| Linoleic acid | 10-20 |
| Saturated fatty acids | 5-15 |

In one or more embodiments, the oil mixture may comprise, among other components, one or more fatty acids, such as oleic acid and linoleic acid. For instance, the oil mixture may comprise from 25 wt. % to 35 wt. % oleic acid and from 10 wt. % to 20 wt. % linoleic acid.

The oil mixture may comprise oleic acid in a concentration ranging from 25 wt. % to 35 wt. %, from 26 wt. % to 34 wt. %, from 27 wt. % to 33 wt. %, from 28 wt. % to 32 wt. %, or even from 29 wt. % to 31 wt. %.

The oil mixture may comprise linoleic acid in a concentration ranging from 10 wt. % to 20 wt. %, from 11 wt. % to 19 wt. %, from 12 wt. % to 18 wt. %, from 13 wt. % to 17 wt. %, or even from 14 wt. % to 16 wt. %.

In one or more embodiments, the oil mixture comprises jojoba oil. In one or more embodiments, the oil mixture is all naturally derived jojoba oil or a portion of naturally derived jojoba oil, meaning at least a portion of the oil mixture is oil derived from the jojoba plant. The jojoba plant may be naturally occurring or be a cultivated variety.

Not all naturally occurring oils are suitable for use in acid treatment of subterranean formations. In embodiments, the oil is miscible in water and is capable of reducing the surface tension of the water.

In one or more embodiments, the acidizing fluid may further include various additives. For instance, the acidizing fluid may include an anti-emulsifier, an emulsified acid, a corrosion inhibitor, an iron control agent, a mutual solvent, a corrosion inhibitor intensifier, an anti-sludge agent, or a mixture of two or more of these.

Exemplary anti-emulsifiers include methanol; oxyalkylated alkyl alcohols; oxyalkylated alcohols; quaternary ammonium compounds; heavy aromatic naphtha (also referred to as "solvent naphtha"); blends containing (1) tannin or aminomethylated tannin, (2) a cationic polymer, and (3) one or more polyfunctional amines; a copolymer of diallyldimethyl ammonium chloride and quaternized amino alkylmethacrylates and (meth)acrylic esters (such as, for example, 2-ethylhexylacrylate); an amphoteric acrylic acid copolymer; a branched polyoxyalkylene copolyester; a copolymer of esters of acrylic acid and the respective acids; methacrylic acid; a copolymer of polyglycol acrylate or methacrylate esters; poly(1-acryloyl-4-methyl piperazine and copolymers of 1-acryloyl-4-methyl piperazine quaternary salts with acrylamide quaternary salts; copolymers of acrylamidopropyltrimethyl ammonium chloride with acrylamide; vinyl phenol polymers; an ethoxylated or epoxidized polyalkylene glycol; polymers from dimethylaminoethyl methacrylate; dimethylaminopropyl methacrylamide; polymers of monoallylamine; copolymers of allyl-polyoxyalkylenes with acrylics; copolymers of diallyldimethyl ammonium chloride and vinyl trimethoxysilane; cationic amide-ester compositions; polyalkylenepolyamide-amines; fatty acid N,N-dialkylamides; diamides from fatty amines; and a mixture of two or more thereof.

Exemplary emulsified acids include a hydrocarbon, emulsifier, and acid. The hydrocarbon may include, for example, synthetic oil, diesel, aromatic solvents, hydrocarbon solvents, and a mixture of two or more of these. The emulsifier may include polyether compounds, citric-acid based polyamides, surfactants (including ionic surfactants such as fatty acids, amines, amides, and organic sulfonates, and nonionic surfactants such as ethoxylated surfactants), and mixtures of two or more thereof. The acid may include retarded acids, visco-elastic surfactant acids, diverting acids, gelled acids, and mixtures of two or more thereof.

Exemplary corrosion inhibitors include amides, imidazolines, salts of nitrogenous molecules with carboxylic acids (such as fatty acids and naphthenic acids), quaternary nitrogen compounds, polyoxylated amines, polyoxylated amides, polyoxylated imidazolines, and nitrogen hetrocyclics.

Exemplary iron control agents include sodium erythorbate, acetic acid, citric acid, erythorbic acid, and complexing agents such as tetrasodium ethylene diamine tetraacetate, glucono-δ-lactone, ethylenediaminetetraacetic acid (EDTA), nitrilotriacetic acid (NTA), hydroxyethylethylene diaminetriacetic acid (HEDTA), hydroxyethyliminodiacetic acid, and the salts formed from the aforementioned compounds. In embodiments, these iron control agents are used in conjunction with nitrogen-containing compounds such as hydroxylamine salts or hydrazine salts.

Exemplary mutual solvents include modified glycol ethers including, but not limited to, monoglycol butyl ether; microemulsions; nanoemulsions; sulfonic-based microemulsions; and mixtures of two or more thereof. As used herein, the term "microemulsion" refers to the International Union of Pure and Applied Chemistry definition of a microemulsion, which is a dispersion made of water, oil, and surfactant(s) that is an isotropic and thermodynamically stable system with dispersed domain diameter varying approximately from 1 nm to 100 nm, usually 10 to 50 nm. The term "nanoemulsion" refers to a similar dispersion; however, the dispersion of a nanoemulsion is not thermodynamically stable.

Exemplary corrosion inhibitor intensifiers include formic acid, antimony-based intensifiers, metal salts of iodide and chloride, ammonium iodide (such as phenyltrimethylammonium iodide, for example), phosphonium iodides (such as ethyltriphenylphosphonium iodide, for example), and salts of mercury. An exemplary metal salt of iodide includes cuprous iodide.

Exemplary anti-sludge agents include dodecylbenzene sulfonic acid; ethoxylated alcohol; propan-2-ol, 2-butoxyethanol; ethane-1,2-diol, aliphatic amide derivatives; blends containing (1) tannin or aminomethylated tannin, (2) a cationic polymer, and (3) one or more polyfunctional amines; a copolymer of diallyldimethyl ammonium chloride and quaternized amino alkylmethacrylates and (meth)acrylic esters (such as, for example, 2-ethylhexylacrylate); an amphoteric acrylic acid copolymer; a branched polyoxyalkylene copolyester; a copolymer of esters of acrylic acid and the respective acids; methacrylic acid; a copolymer of polyglycol acrylate or methacrylate esters; poly(1-acryloyl-4-methyl piperazine and copolymers of 1-acryloyl-4-methyl piperazine quaternary salts with acrylamide quaternary salts; copolymers of acrylamidopropyltrimethyl ammonium chloride with acrylamide; vinyl phenol polymers; an ethoxylated or epoxidized polyalkylene glycol; polymers from dimethylaminoethyl methacrylate; dimethylaminopropyl methacrylamide; polymers of monoallylamine; copolymers of allyl-polyoxyalkylenes with acrylics; copolymers of diallyldimethyl ammonium chloride and vinyl trimethoxysilane; cationic amide-ester compositions; polyalkylenepolyamideamines; fatty acid N,N-dialkylamides; diamides from fatty amines; and a mixture of two or more thereof.

According to additional embodiments, a method of improving hydrocarbon recovery from a subterranean formation may include contacting the subterranean formation with the acidizing fluid and collecting the hydrocarbons displaced by the acidizing fluid. The acidizing fluid is as described above.

As used herein, the term "hydrocarbons" refers to substances formed from hydrogen and carbon atoms. Other atoms may also be present, such as oxygen, sulfur, and nitrogen, for example.

The subterranean formation may be contacted by the acidizing fluid, driving out hydrocarbons contained in the subterranean formation. Without intending to be bound to any particular theory, it is believed that the acidizing fluid dissolves unwanted substances in the formation, pipes, surface equipment, or flow-lines, and stimulates the formation. Then, hydrocarbons from the rock formation may be displaced and driven toward a collection point. As a result, production of the hydrocarbons may be increased or restored.

According to additional embodiments, a hydrocarbon well may include a subterranean formation, a borehole, and the acidizing fluid. The acidizing fluid is as described above. As used herein, the term "borehole" refers to an opening in the ground that provides access to a subterranean formation.

In a first aspect, an acidizing fluid suitable for use in acid treatment of subterranean formations includes an aqueous base fluid; an acid; and a surfactant comprising an oil mixture. The oil mixture comprises no more than 5% by volume of the acidizing fluid.

In a second aspect, which may be an independent aspect or combined with any other aspect, a method of improving hydrocarbon recovery from a subterranean formation includes contacting the subterranean formation with an acidizing fluid; and collecting the hydrocarbons displaced by the acidizing fluid. The acidizing fluid includes an aqueous base fluid; an acid; and a surfactant comprising an oil mixture. The oil mixture comprises no more than 5% by volume of the acidizing fluid.

In a third aspect, which may be an independent aspect or combined with any other aspect, the oil mixture comprises at least 11-eicosenoic acid, oleic acid, and erucic acid.

In a fourth aspect, which may be an independent aspect or combined with any other aspect, the oil mixture includes from 65 mol. % to 80 mol. % 11-eicosenoic acid; from 5 mol. % to 15 mol. % oleic acid; and from 10 mol. % to 20 mol. % erucic acid.

In a fifth aspect, which may be an independent aspect or combined with any other aspect, the oil mixture comprises jojoba oil.

In a sixth aspect, which may be an independent aspect or combined with any other aspect, the oil mixture comprises all naturally derived jojoba oil or a portion of naturally derived jojoba oil.

In a seventh aspect, which may be an independent aspect or combined with any other aspect, the oil mixture is in a concentration of less than or equal to 0.9% by volume of the acidizing fluid.

In an eighth aspect, which may be an independent aspect or combined with any other aspect, at least 99 wt. % of the aqueous base fluid is brine.

In a ninth aspect, which may be an independent aspect or combined with any other aspect, the oil mixture has a concentration of from 0.5% by volume of the acidizing fluid to 0.8% by volume of the acidizing fluid.

In a tenth aspect, which may be an independent aspect or combined with any other aspect, the oil mixture has a concentration of from 0.6% by volume of the acidizing fluid to 0.7% by volume of the acidizing fluid.

In as eleventh aspect, which may be an independent aspect or combined with any other aspect, the oil mixture comprises at least 11-eicosenoic acid, oleic acid, and erucic acid.

In a twelfth aspect, which may be an independent aspect or combined with any other aspect, the acid comprises hydrochloric acid.

In a thirteenth aspect, which may be an independent aspect or combined with any other aspect, the acid does not comprise sulfuric acid.

In a fourteenth aspect, which may be an independent aspect or combined with any other aspect, the acid comprises a sulfonic acid.

In a fifteenth aspect, which may be an independent aspect or combined with any other aspect, the acidizing fluid comprises the hydrochloric acid in a concentration of from 5% by volume of the acidizing fluid to 15% by volume of the acidizing fluid.

In a sixteenth aspect, which may be an independent aspect or combined with any other aspect, the acidizing fluid comprises the hydrochloric acid in a concentration of from 7.5% by volume of the acidizing fluid to 12.5% by volume of the acidizing fluid.

In a seventeenth aspect, which may be an independent aspect or combined with any other aspect, the acidizing fluid comprises the acid in a concentration of from 5% by volume of the acidizing fluid to 15% by volume of the acidizing fluid.

In an eighteenth aspect, which may be an independent aspect or combined with any other aspect, the acidizing fluid comprises the acid in a concentration of from 7.5% by volume of the acidizing fluid to 12.5% by volume of the acidizing fluid.

In a nineteenth aspect, which may be an independent aspect or combined with any other aspect, the acid is selected from the group consisting of hydrochloric acid, hydrofluoric acid, sulfonic acid, sulfonic acid derivatives, in situ generated acids, carboxylic acids, and combinations of two or more of these.

In a twentieth aspect, which may be an independent aspect or combined with any other aspect, the oil mixture consists of jojoba oil.

In a twenty-first aspect, which may be an independent aspect or combined with any other aspect, the acidizing fluid further comprises an anti-emulsifier.

In a twenty-second aspect, which may be an independent aspect or combined with any other aspect, the acidizing fluid further comprises an emulsified acid.

In a twenty-third aspect, which may be an independent aspect or combined with any other aspect, the acidizing fluid further comprises a corrosion inhibitor, an iron control agent, a mutual solvent, a corrosion inhibitor intensifier, an anti-sludge agent, or a mixture of two or more of these.

In a twenty-fourth aspect, which may be an independent aspect or combined with any other aspect, the oil mixture comprises no more than 4% by volume of the acidizing fluid.

In a twenty-fifth aspect, which may be an independent aspect or combined with any other aspect, the oil mixture comprises no more than 3% by volume of the acidizing fluid.

In a twenty-sixth aspect, which may be an independent aspect or combined with any other aspect, the oil mixture comprises no more than 2% by volume of the acidizing fluid.

In a twenty-seventh aspect, which may be an independent aspect or combined with any other aspect, the oil mixture comprises no more than 1% by volume of the acidizing fluid.

EXAMPLE

Using the embodiments of the present disclosure, acidizing fluids were produced that exemplify the attributes presently described. It should be understood that the ensuing Examples are illustrative of one or more embodiments presently disclosed and should not be construed as in any way as limiting on the appended claims or other portions of the present application.

Acidizing fluid 1 was prepared by combining components in concentrations as provided in Table 4.

TABLE 4

| Component | Commercial Compound Used[1] | Concentration (gpt)[2] | Concentration (vol. %)[3] |
|---|---|---|---|
| Mutual solvent | Butylmethyl ether | 55 | 5.5 |
| Corrosion inhibitor | A262[4] | 3 | 0.3 |
| Chelating agent | NaEDTA | 60 | 6 |
| Iron control agent | Acetic acid | 10 | 1 |
| Anti-emulsifier | W054[5] | 7 | 0.7 |
| Anti-sludge agent | W060[6] | 7 | 0.7 |
| | Formic acid | 85 | 9 |
| | 31% hydrochloric acid | 87 | 20 |
| | Jojoba oil | 2 | 0.2 |
| | Water | 684 | 68.4 |

[1]All commercial compounds were obtained from Schlumberger Limited of France.
[2]gallons per thousand gallons.
[3]volume percent.
[4]A262 is an amine-based corrosion inhibitor.
[5]W054 is a mixture of methanol, oxyalkylated alcohol, aromatic naphtha, and a quaternary ammonium compound.
[6]W060 is a mixture of dodecylbenzene sulfonic acid, ethoxylated alcohol, and propanol.

The thermal stability of acidizing fluid 1 was examined by holding samples of acidizing fluid 1 at room temperature, at 80° C., and at 120° C. for 16 hours. Without intending to be bound by any particular theory, it was believed that a precipitate would form if the acidizing fluid was unstable. No such precipitate was observed at any temperature for any amount of time.

The surface tension reduction ability of acidizing fluid 1, using jojoba oil as a surfactant, was compared with that of an acidizing fluid using a commercial acidizing surfactant (polyethylene glycol monohexyl ether). Other than the surfactant used, all other components of the formulations were similar, as were the environments used for testing of each acidizing fluid.

As shown in THE FIGURE, the acidizing fluid using jojoba oil exhibited a superior surface tension reduction ability over that of the acidizing fluid containing a commercial surfactant. Without intending to be bound by any particular theory, it is believed that the reduced surface tension may reduce the energy required for pumping the acidizing fluid into a subterranean formation.

It is noted that recitations in the present disclosure of a component of the present disclosure being "operable" or "sufficient" in a particular way, to embody a particular property, or to function in a particular manner, are structural recitations, as opposed to recitations of intended use. More specifically, the references in the present disclosure to the manner in which a component is "operable" or "sufficient" denotes an existing physical condition of the component and, as such, is to be taken as a definite recitation of the structural characteristics of the component.

Having described the subject matter of the present disclosure in detail and by reference to specific embodiments, it is noted that the various details disclosed in the present disclosure should not be taken to imply that these details relate to elements that are essential components of the various embodiments described in the present disclosure. Further, it will be apparent that modifications and variations are possible without departing from the scope of the present disclosure, including, but not limited to, embodiments defined in the appended claims.

It is noted that one or more of the following claims utilize the term "wherein" as a transitional phrase. For the purposes of defining the present subject matter, it is noted that this term is introduced in the claims as an open-ended transitional phrase that is used to introduce a recitation of a series of characteristics of the structure and should be interpreted in like manner as the more commonly used open-ended preamble term "comprising."

What is claimed is:

1. An acidizing fluid suitable for use in acid treatment of subterranean formations, the acidizing fluid comprising:
   an aqueous base fluid;
   an acid selected from the group consisting of hydrochloric acid, hydrofluoric acid, sulfonic acid, sulfonic acid derivatives, in situ generated acids, carboxylic acids, and combinations of two or more of these; and
   a surfactant consisting of an oil mixture selected from the group consisting of jojoba oil, castor oil, cactus oil, almond oil, or combinations thereof, wherein:
      the acidizing fluid comprises the acid in a concentration of from 1% by volume of the acidizing fluid to 24% by volume of the acidizing fluid, and
      the acidizing fluid comprises no more than 5% by volume oil mixture.

2. The acidizing fluid of claim 1, wherein the oil mixture consists of one or more fatty acids chosen from 11-eicosenoic acid, oleic acid, and erucic acid.

3. The acidizing fluid of claim 1, wherein the oil mixture consists of:
   from 65 mol. % to 80 mol. % 11-eicosenoic acid;
   from 5 mol. % to 15 mol. % oleic acid; and
   from 10 mol. % to 20 mol. % erucic acid.

4. The acidizing fluid of claim 1, wherein the oil mixture consists of jojoba oil.

5. The acidizing fluid of claim 1, wherein the oil mixture is in a concentration of less than or equal to 0.9% by volume of the acidizing fluid.

6. The acidizing fluid of claim 1, wherein the acidizing fluid comprises no more than 4% by volume oil mixture.

7. The acidizing fluid of claim 1, wherein the acidizing fluid comprises the acid in a concentration of from 5% by volume of the acidizing fluid to 15% by volume of the acidizing fluid.

8. The acidizing fluid of claim 1, wherein the acidizing fluid further comprises an anti-emulsifier, an emulsified acid, a corrosion inhibitor, an iron control agent, a mutual solvent, a corrosion inhibitor intensifier, an anti-sludge agent, or a mixture of two or more of these.

9. The acidizing fluid of claim 8, wherein the anti-emulsifier comprise s methanol, oxyalkylated alkyl alcohols, oxyalkylated alcohols, aromatic naphtha, a quaternary ammonium compound, or combinations thereof.

10. A method of improving hydrocarbon recovery from a subterranean formation, the method comprising:
    contacting the subterranean formation with an acidizing fluid; and
    collecting the hydrocarbons displaced by the acidizing fluid;
    wherein:
       the acidizing fluid comprises:
          an aqueous base fluid;
          an acid selected from the group consisting of hydrochloric acid, hydrofluoric acid, sulfonic acid, sulfonic acid derivatives, in situ generated acids, carboxylic acids, and combinations of two or more of these; and
          a surfactant consisting of an oil mixture selected from the group consisting of jojoba oil, castor oil, cactus oil, almond oil, or combinations thereof, wherein:
             the acidizing fluid comprises the acid in a concentration of from 1% by volume of the acidizing fluid to 24% by volume of the acidizing fluid, and
             the acidizing fluid comprises no more than 5% by volume oil mixture.

11. The method of claim 10, wherein the oil mixture consists of one or more fatty acids chosen from 11-eicosenoic acid, oleic acid, and erucic acid.

12. The method of claim 10, wherein the oil mixture consists of:
    from 65 mol. % to 80 mol. % 11-eicosenoic acid;
    from 5 mol. % to 15 mol. % oleic acid; and
    from 10 mol. % to 20 mol. % erucic acid.

13. The method of claim 10, wherein the oil mixture consists of jojoba oil.

14. The method of claim 10, wherein the oil mixture is in a concentration of less than or equal to 0.9% by volume of the acidizing fluid.

15. The method of claim 10, wherein the acidizing fluid comprises no more than 4% by volume oil mixture.

16. The method of claim 10, wherein the acidizing fluid comprises the acid in a concentration of from 5% by volume of the acidizing fluid to 15% by volume of the acidizing fluid.

17. The method of claim 10, wherein the acidizing fluid further comprises an anti-emulsifier, an emulsified acid, a corrosion inhibitor, an iron control agent, a mutual solvent, a corrosion inhibitor intensifier, an anti-sludge agent, or a mixture of two or more of these.

18. The method of claim 17, wherein the anti-emulsifier comprise s methanol, oxyalkylated alkyl alcohols, oxyalkylated alcohols, aromatic naphtha, a quaternary ammonium compound, or combinations thereof.

* * * * *